Patented Oct. 18, 1927.

1,646,268

UNITED STATES PATENT OFFICE.

JOSEPH WARNER, OF NASHVILLE, TENNESSEE.

MANUFACTURE OF FERROPHOSPHORUS.

No Drawing.   Application filed June 16, 1927.  Serial No. 199,406.

My invention relates to the production of ferro-phosphorus and has particularly in view a two step process for making the alloy.

In prior processes for making ferro-phosphorus, large quantities of silicious matter are added to the charge so that a large amount of phosphate rock or bone phosphate of lime may be added with which to neutralize the silicious matter in order to have a sufficient amount of phosphorus present to enter the reduced metal and make a standard grade of ferro-phosphorus containing for instance 18% of phosphorus. In the usual blast furnace practice, the silicious matter comes largely from the added iron ore. There are disadvantages in adding large quantities of silicious matter because the most expensive part of blast furnace operations is the fluxing of the silicious matter from which nothing of value can be had and the large amount of slag produced is expensive to dispose of. A large amount of slag also carries off a large amount of phosphorus that cannot be recovered.

My process therefore is directed to the production of ferro-phosphorus in which a minimum amount of slag will be produced. With this idea in view therefore, I substitute for the large quantities of high silicious bearing iron ores of prior processes, metallic iron, such as scrap, or a mixture of metal and iron ore; or I may use iron ore with a smaller amount of silicious matter alone, instead of the large quantities of high silicious ores now used. In any combination of materials which may form the charge, it is essential that the total amount of silica shall be much less than in prior processes in order that only a minimum amount of slag shall be produced.

My procedure is as follows:

The coke, phosphate rock and the iron bearing material are charged into the top of the blast furnace and in such proportions that only enough phosphate rock or bone phosphate of lime is added to combine with the limited amount of silicious and other acid matters in the coke, the phosphate rock and the iron bearing material. In this manner, I produce ferro-phosphorus containing on the average from 10 to 16% of phosphorus. It is doubtful if a higher percentage could be obtained with the limited amount of silicious matter used. This is the first step in my process.

In order to increase the phosphorus content of the alloy, I first make and lay aside, say 1000 tons of the low-grade ferro phosphorus produced in the first step. I then put it through the furnace a second time, charging the furnace substantially as before, but using as the metallic part of the charge, some of the low grade ferro phosphorus—for instance 30 to 70%, the remainder of the metallic charge being substantially as in the first charge. The proportions of metallic substance and ferro-phosphorus to be used can be readily determined by actual practice, say from 1% to 100%.

A typical charge not using iron ore and a highly silicious phosphate rock, which can be used as in the first step of the process is as follows:

| Charge. | Acids. | Pounds. |
|---|---|---|
| 3600 lbs. coke | Per cent 13 | 468 |
| 5000 lbs. phosphate rock | 17 | 850 |
| 2500 lbs. metallic iron | 5 | 125 |
| 7500 | | 1443 |

5000 lbs. 50% phosphate rock = B. P. L.
    27% fluxing ability = 1350.
Acids to lime, 1.07.

Ferro phosphorus.

5000 lbs. 50% phosphate rock B. P. L.
    9% available phosphorus___ 450
2500 lbs. metallic iron 90%_____ 2250
                                                           2700 which is 15% plus of phosphorus in the metal.

The second step is as follows:

| Charge. | Acids. | Pounds. |
|---|---|---|
| 3600 lbs. coke | Per cent. 13 | 468 |
| 5000 lbs. phosphate rock | 17 | 850 |
| 1250 lbs. ferro phosphorus | 00 | |
| 1250 lbs. metallic iron | 5 | 75 |
| | | 1393 |

*Phosphate rock.*

5000 lbs. 50% B. P. L.=
27% Fluxing ability, 1350.
Acids to lime, 1.03.

*Ferro phosphorus.*

| | |
|---|---|
| 5000 lbs. 50% phosphate rock. 9% available phosphorus | 450 |
| 1250 ferro phosphorus 15% P | 187 |
| 1250 ferro phosphorus 85% I | 1063 |
| 1250 metallic iron 90% | 1125 |
| | 2825 | which is 22% plus of phosphorus in the metal.

If it is desired to add mill cinder and a high grade phosphate rock as a part of the charge the following proportions have been found practicable:

| Lime. | Charge. | Acids. | Pounds. |
|---|---|---|---|
| 75% phosphate rock has 40% fluxing ability— 1200 lbs. | 3600 lbs. coke | Per cent. 13 | 468 |
| | 3000 lbs. phosphate rock. | 5 | 150 |
| | 2200 lbs. scrap | 5 | 110 |
| | 1500 lbs. mill cinder | 35 | 525 |
| | 6700 | | 1253 |

Lime, 1200
Acids, 1253=1.04 acid to lime

| | Phosphorous lbs. |
|---|---|
| 3000 lbs. 75% rock=15% available phosphorus= | 450 |
| 2200 lbs. 95% yield= | 2090 |
| 1500 lbs. mill cinder 50% yield= | 750 |
| Ferro phosphorus | 3290 | which is 13% plus of phosphorus in the metal.

The second step would be as follows using a greater amount of ferro phosphorus:

| Charge. | Acids. | Pounds. |
|---|---|---|
| 3600 lbs. coke | Per cent. 13 | 468 |
| 3000 lbs. phosphate rock | 5 | 150 |
| 1800 lbs. ferro phosphorus | | |
| 600 lbs. scrap | 5 | 30 |
| 1800 lbs. mill cinder | 35 | 630 |
| | | 1278 |

3000 lbs. phosphate rock 75% B. P. L.
40% fluxing ability, 1200.
Acids to lime, 1.06.

*Ferro phosphorus.*

| | |
|---|---|
| 3000 lbs. 75% phosphate rock. 15% available phosphorus | 450 |
| 1800 lbs. ferro phosphorus, 13% phosphorus | 234 |
| 1800 lbs. ferro phosphorus, 87% iron | 1560 |
| 600 lbs. scrap, 90% | 540 |
| 1800 lbs. mill cinder, 50% | 900 |
| | 3690 | which is 18% plus of phosphorus in the metal.

If it is desired to use only iron ore, then the following charge can be used:

| Lime. | Charge. | Acids. | Pounds. |
|---|---|---|---|
| 75% phosphate rock has 40% fluxing ability— 1080 lbs. | 3600 lbs. coke | Per cent. 13 | 468 |
| | 2700 lbs. phosphate rock. | 5 | 125 |
| | 4500 lbs. iron ore | 15 | 600 |
| | 7200 | | 1193 |

Lime, 1080.
Acids, 1218—1.10 acids to lime.

| | Phosphorus lbs. |
|---|---|
| 2700 lbs. 75% rock—15% available phosphorus | 405 |
| 4500 lbs. iron ore, 48% yield | 2160 |
| Ferro phosphorus | 2565 | which is 15% plus of phosphorus in the metal.

The second step is about as follows supplying necessary silicious matter from mill cinder and ore:

| Charge. | Acids. | Pounds. |
|---|---|---|
| 3600 lbs. coke | Per cent 13 | 468 |
| 2700 lbs. phosphate rock | 5 | 150 |
| 1500 lbs. ferro phosphorus | | |
| 1500 lbs. mill cinder | 35 | 450 |
| 1500 lbs. ore | 15 | 225 |
| | | 1193 |

2700 lbs. phosphate rock 75% B. P. L.
40% fluxing ability, 1080.
Acids to lime, 1:10

*Ferro phosphorus.*

| | |
|---|---|
| 2700 lbs. phosphate rock 15% available | 450 |
| 1500 ferro phosphorus, 15% phosphorus | 225 |
| 1500 ferro phosphorus, 85% iron | 1275 |
| 1500 mill cinder, 50% | 750 |
| 1500 ore, 45% | 675 |
| | 3375 | which is 20% plus of phosphorus in the metal.

From the above, it will be clear that in my process, a small amount of phosphorus is first put into the metal and that this alloy so produced is remelted for the purpose of increasing the phosphorus to the required market percentage. My process involving two steps to attain the desired percentage of phosphorus in the alloy is found to be cheaper and better than the one step process in which a large quantity of silicious material is necessary.

Owing to the use in my new process of a larger quantity of metallic iron in some form, a less quantity of hot air will be necessary in carrying out the process and will be desirable from an economic standpoint. This decrease in air will also prevent excessive volatilization of phosphorus passing off in the escaping gases, as is the case in the usual ferro phosphorus furnace practice of using large quantities of air which is necessary for the reduction, proper working, and fluxing of a high silicious burden or charge.

The affinity of phosphorus for iron is very strong. They will readily unite when brought together in the molten state but it requires a very high degree of heat to unite them to the best advantage. By my process, on account of the small amount of silicious matter, the furnace can be operated at a much higher degree of heat than in the old practice. Metallic iron melts higher up in the blast furnace than iron ores and for this reason the molten metal is exposed to the action of the phosphoric gases longer and at a greater heat and will thus absorb more phosphorus than in the usual practice. By my process, it is possible to recover 90% up of all phosphorus put into the top of the furnace. The loss of phosphorus in the usual practice is 30 to 40%.

While I have described my process in connection with the production of ferrophosphorus in a blast furnace, with suitable modification, the same principles are applicable in electric furnaces.

What I claim as new and desire to secure by Letters Patent is:

1. The process of producing a high percentage ferro-phosphorus which comprises charging the furnace with a mixture containing ferro-phosphorus, coke and phosphate bearing material and a metallic substance, the amount of phosphate bearing material being added in only such quantity as to provide the necessary fluxing ability to combine with the silica in the said mixture.

2. A two step process for producing ferro phosphorus which comprises charging the furnace with a mixture containing iron bearing material, coke and phosphate bearing material, the amount of phosphate bearing material being added in only such quantity as to provide the necessary fluxing ability to combine with the silica in the said mixture, then taking the ferro phosphorus so produced and adding it as a part of a similar charge, whereby its percentage of phosphorus is increased.

3. A two step process for producing ferrophosphorus which comprises charging the furnace with a mixture containing iron bearing material, coke and phosphate bearing material and smelting the same to produce a ferro-phosphorus containing substantially 10–16% of phosphorus and thereafter increasing the percentage of phosphorus by adding the ferro phosphorus alloy as a part of another charge.

4. A two step process for producing ferro phosphorus which comprises charging the furnace with suitable iron-bearing material, coke and phosphate bearing material, the total amount of silica in the charge being so limited as to produce a ferro phosphorus having only a relatively small amount of phosphorus and thereafter increasing the percentage of phosphorus by adding the ferro-phosphorus alloy as a part of another charge.

In testimony whereof, I hereby affix my signature.

JOSEPH WARNER.